Feb. 21, 1928.
K. H. MAY
1,659,606
SYNCHRONOSCOPE
Filed July 15, 1927
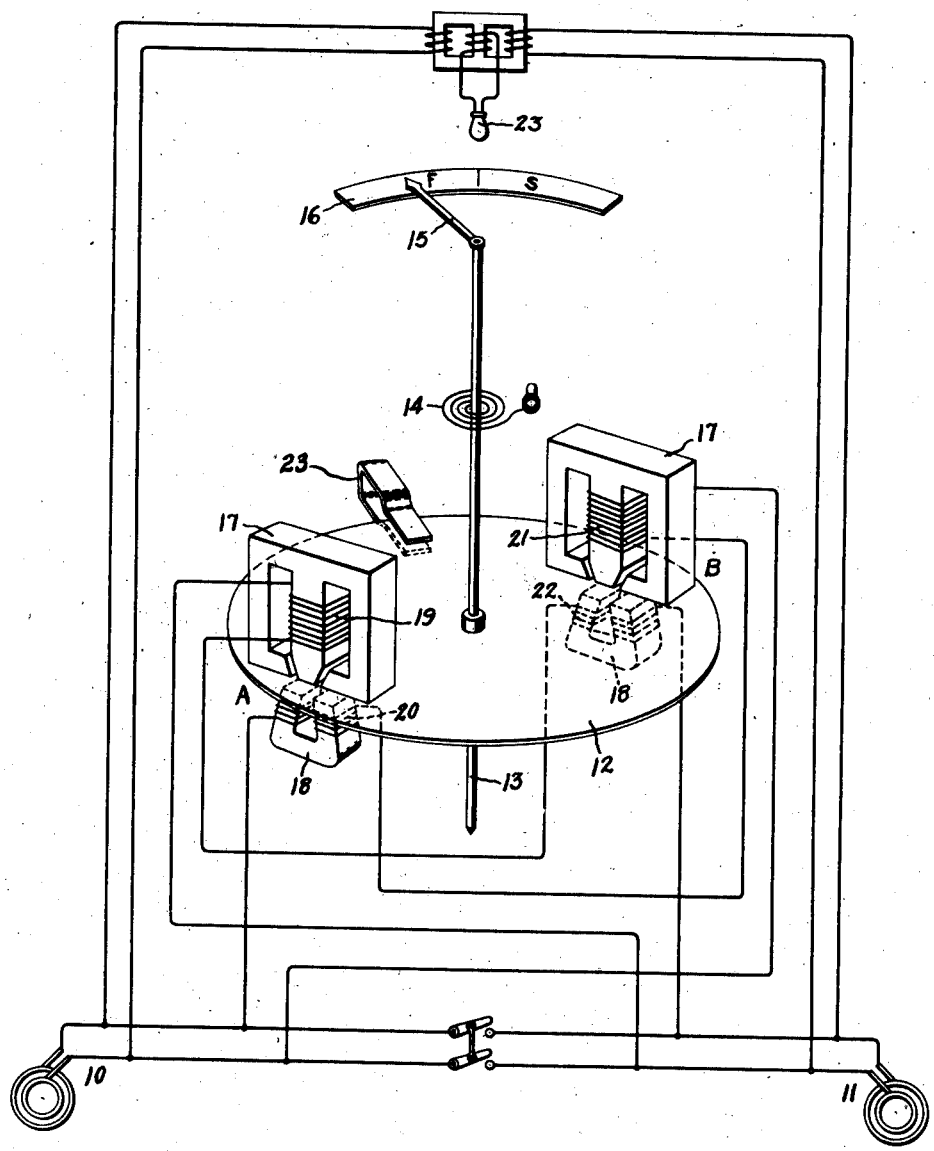
Inventor:
Karl May,
by
His Attorney.

Patented Feb. 21, 1928.

1,659,606

UNITED STATES PATENT OFFICE.

KARL H. MAY, OF BERLIN, GERMANY, ASSIGNOR TO GENERAL ELECTRIC COMPANY, A CORPORATION OF NEW YORK.

SYNCHRONOSCOPE.

Application filed July 15, 1927, Serial No. 206,111, and in Germany August 31, 1926.

My invention relates to apparatus for determining the condition of synchronism between two alternating current circuits. Its object is to provide a sensitive and reliable apparatus for this purpose at low cost. In carrying my invention into effect I employ an induction disc and induction field elements cooperating with the disc such that the apparatus may be largely constructed from standard meter parts in a simple manner.

The features of my invention which are believed to be novel and patentable will be pointed out in the claims appended hereto. For a better understanding of my invention, reference will be made in the following description to the accompanying drawing.

Referring to the drawing, the single figure shows the preferred arrangement of the apparatus and its circuit connections to indicate the condition of synchronism between two alternating current systems indicated at 10 and 11. The synchronoscope comprises a rotatably mounted disc of conducting material 12 mounted on a shaft 13. This shaft is biased to a certain rotative position by one or more spiral springs one of which is shown at 14.

When the synchronoscope is to be of the direct indicating type an indicator 15 is secured on the shaft and cooperates with the stationary scale 16 so that the normal position of the pointer as biased by the springs alone is on the central synchronizing indicating point of the scale.

Cooperating with the disc 12 are two similar induction meter torque elements A and B with core parts 17 and 18 similar to those employed in standard watt-hour meters for the potential and current cores respectively. These core parts carry energizing coils 19, 20, 21 and 22. The coil 19 on the E-shaped core of the torque element A is connected in series with the coil 22 of the U-shaped core of torque element B and across one of the sources, for example source 11. The coils 20 and 21 are similarly connected in series across the source 10. A damping device indicated at 23 is preferably provided to damp the oscillations of the disc productive of this arrangement.

The torque of an induction meter element of the character shown at A or B is known to be proportional to the product of the fluxes of the two parts of the element cutting the disc multiplied by the sine of the angle by which the two fluxes are momentarily displaced with respect to each other. Thus, if E and $E_1$ represent the voltages of sources 10 and 11 respectively, and $\Theta$ the phase angle between these voltages, the torque of either element A or B would be proportional to $E\, E_1 \sin \Theta$ if it could be assumed that the respective fluxes of the two parts 17 and 18 of such elements lag behind the impressed electromotive force by equal amounts.

Owing to the fact that the E-shaped core has a large leakage outside of the disc as compared to the U-shaped core, the fluxes of the two parts will be out of phase by the angle $\Theta_1$ when the impressed electromotive forces E and $E_1$ are in phase. As a consequence the torque of either element will be proportional to $E\, E_1 \sin \Theta_1$ when the voltages are in phase.

The two elements A and B and their coils are similar so that the torque components $E\, E_1 \sin \Theta_1$ are equal in both and in accordance with the invention are arranged to oppose each other. The torque resultant of elements A and B on the disc then becomes proportional to $E\, E_1 [\sin (\Theta+\Theta_1)+\sin (\Theta-\Theta_1)]$. By simple conversion the resultant torque appears as $2\, E\, E_1 \cos \Theta_1 \sin \Theta$. Since $\Theta$ is the angle between E and $E_1$ the resultant torque is zero when E and $E_1$ are in phase, or in phase opposition, because then $\sin \Theta$ is zero. At other times the torque will be + or − depending upon whether E lags or leads $E_1$. Thus, the pointer 15 will oscillate back and forth across the scale 16 when the two voltages E and $E_1$ are of different frequency. As the frequencies are equalized the oscillations will become slower and when they are equal the pointer will remain stationary at some point on the scale depending upon the phase difference $\Theta$. When the phases are in coincidence or in phase opposition the resultant torque will be zero and the pointer will return to the middle of the scale.

To determine whether it is phase coincidence or phase opposition we may provide a lamp 23 energized from the middle leg of a three-leg transformer 24 the outer legs of which are energized from the two sources in such manner that when the voltages are in phase the lamp lights. Thus, with the lamp 23 lit and the pointer 15 at its zero torque position the two sources are in synchronism.

The torque of the spring or springs 14 will be such as to restrain the shaft 13 from making a complete rotation or suitable stop may be provided for this purpose.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

1. A synchronoscope having a rotatably mounted shaft provided with means for restraining it from making a complete revolution and to return it to a predetermined position, a pair of similar induction motor torque elements acting in opposition upon said shaft, said torque elements each having a pair of energizing coils, and two energizing circuits for said coils each including an energizing coil from each torque element.

2. A synchronoscope having a rotatably mounted shaft, means for biasing said shaft to a predetermined rotative position, an induction disc secured to said shaft, a pair of similar induction motor torque elements acting in opposition upon said disc, each torque element comprising two electromagnetic members of different magnetic leakage characteristics, an energizing circuit for the electromagnetic members on the two torque elements having different magnetic leakage charactertistics, and a similar energizing circuit for the remaining electromagnets on the two torque elements.

3. A synchronoscope having a rotatably mounted shaft resiliently biased to a predetermined rotative position, an induction disc on said shaft, a pair of induction torque elements acting in opposition on said disc, each comprising an E-shaped core and a U-shaped core with energizing coils for each core, and a pair of energizing circuits each including an energizing coil on the E-shaped core and an energizing coil on the U-shaped core of the different torque elements.

4. In combination with two alternating current sources, a synchronoscope therefor having a pair of similar induction meter elements acting in opposition on a common rotatably mounted indicator system, each of said elements having a pair of electromagnets of different magnetic leakage characteristics and energizing coils for said electromagnets, a circuit energized from one of said sources and connected in series with coils on the cores of different magnetic leakage characteristics located on different elements, and a circuit energized from the other source similarly connected in series with the other energizing coils of said elements.

In witness whereof, I have hereunto set my hand this 21st day of June, 1927.

KARL H. MAY.